(12) United States Patent
Justice

(10) Patent No.: US 10,395,137 B2
(45) Date of Patent: Aug. 27, 2019

(54) METHOD AND PROCESSING UNIT FOR CORRELATING IMAGE DATA CONTENT FROM DISPARATE SOURCES

(71) Applicant: Irvine Sensors Corporation, Costa Mesa, CA (US)

(72) Inventor: James W. Justice, Newport Beach, CA (US)

(73) Assignee: Irvine Sensors Corporation, Costa Mesa, CA (US)

( * ) Notice: Subject to any disclaimer, the term of this patent is extended or adjusted under 35 U.S.C. 154(b) by 0 days.

(21) Appl. No.: 15/457,012

(22) Filed: Mar. 13, 2017

(65) Prior Publication Data

US 2018/0005072 A1 Jan. 4, 2018

Related U.S. Application Data

(60) Provisional application No. 62/306,718, filed on Mar. 11, 2016.

(51) Int. Cl.
| | | |
|---|---|---|
| *G06K 9/00* | (2006.01) | |
| *G06K 9/46* | (2006.01) | |
| *G06T 3/40* | (2006.01) | |
| *G06K 9/62* | (2006.01) | |
| *G06T 1/20* | (2006.01) | |

(52) U.S. Cl.
CPC ....... *G06K 9/4671* (2013.01); *G06K 9/00771* (2013.01); *G06K 9/4619* (2013.01); *G06K 9/6215* (2013.01); *G06K 9/6289* (2013.01); *G06T 3/4038* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 2014/0184803 | A1* | 7/2014 | Chu | ............. G06T 7/292 348/159 |
| 2016/0092736 | A1* | 3/2016 | Mai | ............. G06K 9/00624 382/103 |
| 2016/0379085 | A1* | 12/2016 | Dodballapur | ....... G06K 9/6202 382/218 |

OTHER PUBLICATIONS

Hampapur et al., "Smart video surveillance: exploring the concept of multiscale spatiotemporal tracking", IEEE Signal Processing Magazine, vol. 22, issue 2, Mar. 2005.*
Halupka et al., "Discrete implementation of biologically inspired image processing for target detection", ISSNIP 2011.*

* cited by examiner

*Primary Examiner* — Soo Jin Park
(74) *Attorney, Agent, or Firm* — W. Eric Boyd, Esq.

(57) ABSTRACT

A signal processing appliance is disclosed that will simultaneously process the image data sets from disparate types of imaging sensors and data sets taken by them under varying conditions of viewing geometry, environmental conditions, lighting conditions, and at different times. Processing techniques that emulate how the human visual path processes and exploits data are implemented. The salient spatial, temporal, and color features of observed objects are calculated and cross-correlated over the disparate sensors and data sets to enable improved object association, classification and recognition. The appliance uses unique signal processing devices and architectures to enable near real-time processing.

6 Claims, 5 Drawing Sheets

Architecture of the Cognitive Processing Method Used to Detect and Classify Salient Content of Imagery.

Figure 3. Example of Cognitive-based Scene Processing to Detect, Annotate, and Classify Salient Content.
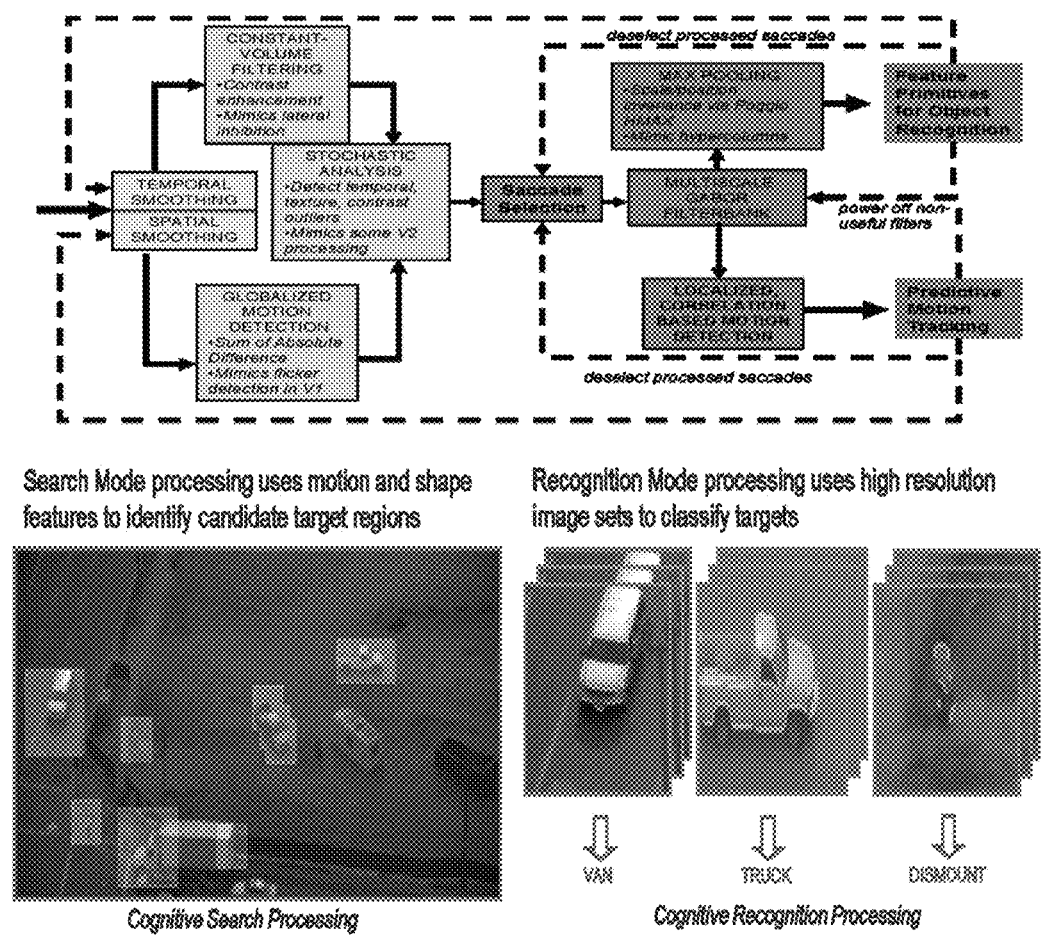

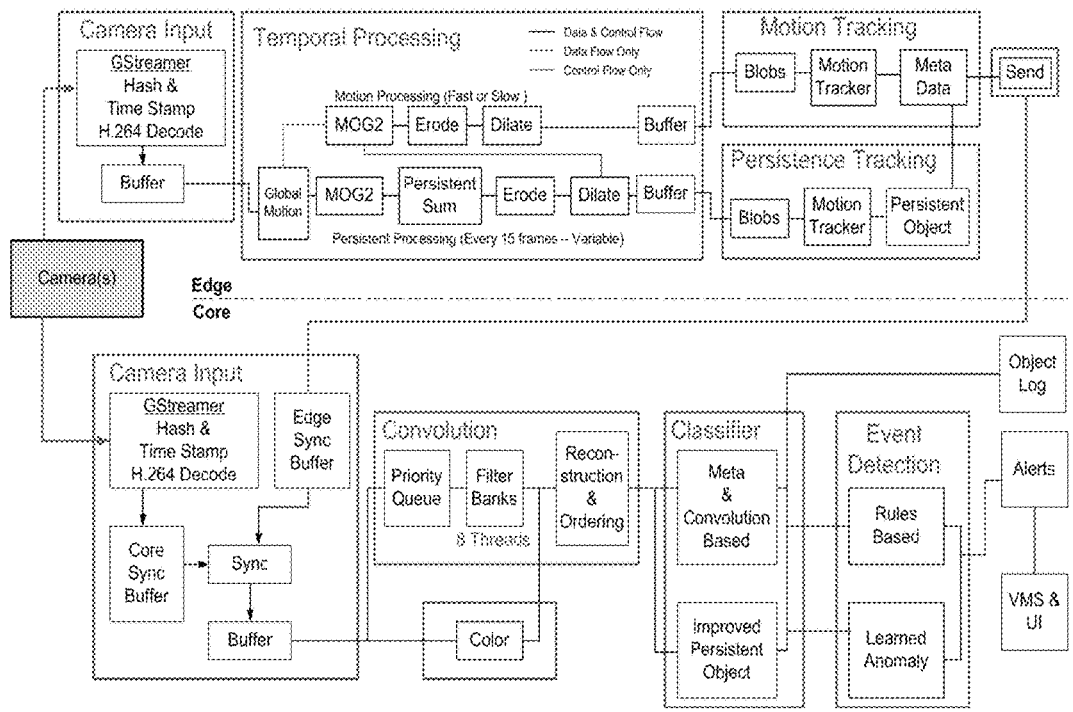
Figure 4. Architecture of the Cognitive Processing Method Used to Detect and Classify Salient Content of Imagery.

Figure 5. Multiple Graphics Processing Units Enable the Cognitive Processor to Perform the Detection and Classification of Multiple Images from Multiple Sensors Sources and Execute the Cross-correlations to Create a Common Operating Picture.
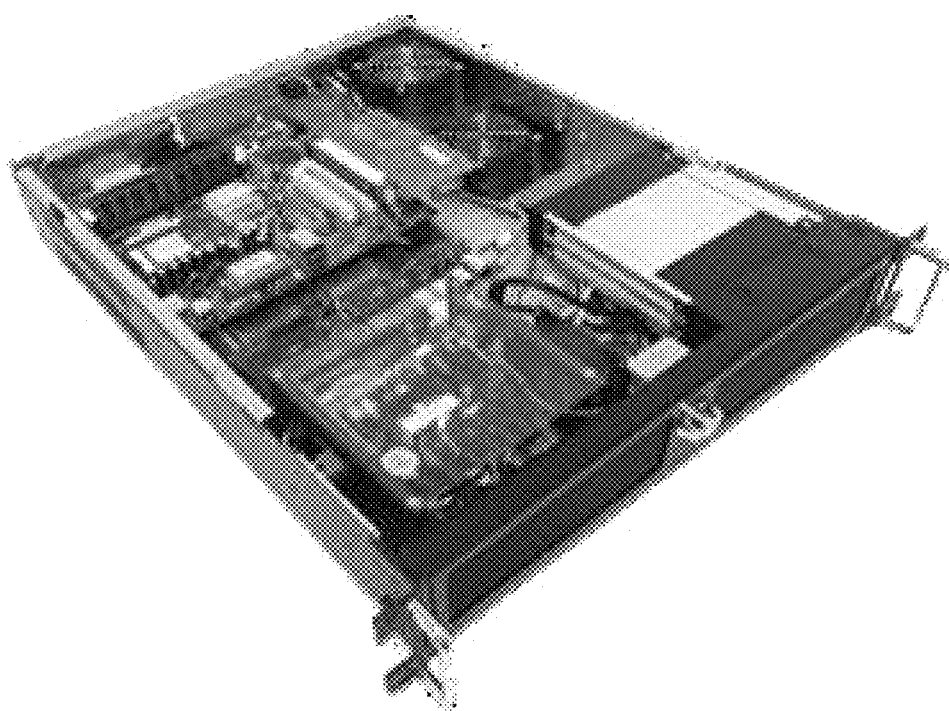

METHOD AND PROCESSING UNIT FOR CORRELATING IMAGE DATA CONTENT FROM DISPARATE SOURCES

CROSS-REFERENCE TO RELATED APPLICATIONS

This application claims the benefit of U.S. Provisional Patent Application No. 62/306,718 filed on Mar. 11, 2016 entitled A Method and Processing Unit for Correlating Image Data Content from Disparate Sources pursuant to 35 USC 119, which application is incorporated fully herein by reference.

STATEMENT REGARDING FEDERALLY SPONSORED RESEARCH AND DEVELOPMENT

N/A

BACKGROUND OF THE INVENTION

I. Field of the Invention

The invention relates generally to the field of image processing. More specifically, the invention relates to a processing unit and methods for simultaneous processing of imaging sensor data streams of scenes observed by different kinds of imaging sensors at different times with different viewing geometries. Salient attributes in the scenes, as observed by each of the imaging sensor systems, are identified by running a plurality of processing algorithms on the image data which are in the form of convolutions on spatial, temporal, and color contents of the images which emulate the image processing of the human visual path consisting of eye, retina, and cortex. The invention produces object detections, object tracks, object classifications, and activity recognitions and interpretations. The salient features derived for objects of interest in the scenes from each imaging sensors are compared by means of cross-modal correlation of the different sensor analysis results. The correlation of salient features across the sets of imagery enables a common operating picture of the observed space to be assembled 2. Description of the Related Art Current approaches to the processing of various sensor data streams that are observing or have observed common scenes in order to determine object content and activities in the scene based on the multiple looks involve the matching of object images to high fidelity three dimensional models of objects and activities of interest. These techniques are often referred to as Automatic Target Recognition, or ATR, processing. These techniques are quite limited because the template matching process is marginalized as viewing geometries, target orientations, degrees of target obscuration, and environmental conditions vary. Such processing is expensive, requires significant time and human skill to achieve the desired cross observation results.

What is needed is a general process of extracting the salient characteristics of scene objects from each of the various times of observations and from each of the various sensors and using the derived cognitive saliency values to associate the observations of given objects across the various data sets. In addition there is a need for being able to execute the cross modal correlations in near real-time by hosting the processing architectures on specially designed processors that can accommodate the massive data flows from the disparate sensors suites and accomplish the massively parallel processing necessary to execute the cognitive saliency computations.

BRIEF SUMMARY OF THE INVENTION

Salient attributes in the scenes, as observed by each of multiple types of imaging sensor systems, are identified by running a plurality of processing algorithms on the image data which are in the form of convolutions on spatial, temporal, and color contents of the images which emulate the image processing of the human visual path consisting of eye, retina, and cortex. The invention produces object detections, object tracks, object classifications, and activity recognitions and interpretations. The salient features derived for objects of interest in the scenes from each imaging sensors are compared by means of cross-modal correlation of the different sensor analysis results. The correlation of salient features across the sets of imagery enables a common operating picture of the observed space to be assembled. The unique computational requirements of the saliency-based, cognitive-inspired processing approach are realized in special purpose architectures using state of the art processing devices such as FPGAs, GPUs, and CPUs.

In a first aspect of the invention, a signal processing appliance is disclosed that determines the salient object content of disparate image sensors and multiple sensor data sets and associates the same object across the various data sets based on their objects salient features extracted from an analysis of the spatial, temporal, and color content of the object using cognitive-inspired techniques.

In a second aspect of the invention, the signal processing appliance determines the degrees of spatial correlation of image scene objects across multiple filter banks that may be in the form of Gabor filters of Higher Order Gaussian (HOG) processing.

In a third aspect of the invention, the signal processing appliance determines the degrees of spatial correlations of image scene objects across multiple filter banks that may be in the form of Reichardt filter processing.

In a fourth aspect of the invention, the signal processing appliance determines the degrees of color correlation of image scene objects across multiple filter banks that may be in the form of multi-color filter bank comparison processing.

In a fifth aspect of the invention, the signal processing appliance uses cross-correlation techniques to determine the degree of salient feature correlations that exist for objects observed by the disparate sensors and data sets. These techniques may include Bayesian analysis to determine object classifications under conditions of observational uncertainty.

In a sixth aspect of the invention, the signal processing appliance uses multiple GPUs to accomplish the massively parallel processing required for simultaneous calculations of object salient features across disparate scenes and data sets.

In a seventh aspect of the invention, the signal processing appliance uses multi-core GPUs or CPUs to accomplish the cross-correlation analyses required to associate objects with correlated salient feature across the disparate sensors and data sets.

These and various additional aspects, embodiments and advantages of the present invention will become immediately apparent to those of ordinary skill in the art upon review of the Detailed Description and any claims to follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

BRIEF DESCRIPTION OF THE SEVERAL VIEWS OF THE DRAWINGS

FIG. 3 shows an example of image processing to determine and annotate the salient content and the sequential processing to classify the salient detections.

FIG. 4 shows the detailed architecture of the processing method.

FIG. 5 shows the GPU-based hardware processor unit that executes the processing method of FIG. 4.

The invention and its various embodiments can now be better understood by turning to the following detailed description of the preferred embodiments which are presented as illustrated examples of the invention defined in the claims.

It is expressly understood that the invention as defined by the claims may be broader than the illustrated embodiments described below.

DETAILED DESCRIPTION OF THE INVENTION

Figure 1:
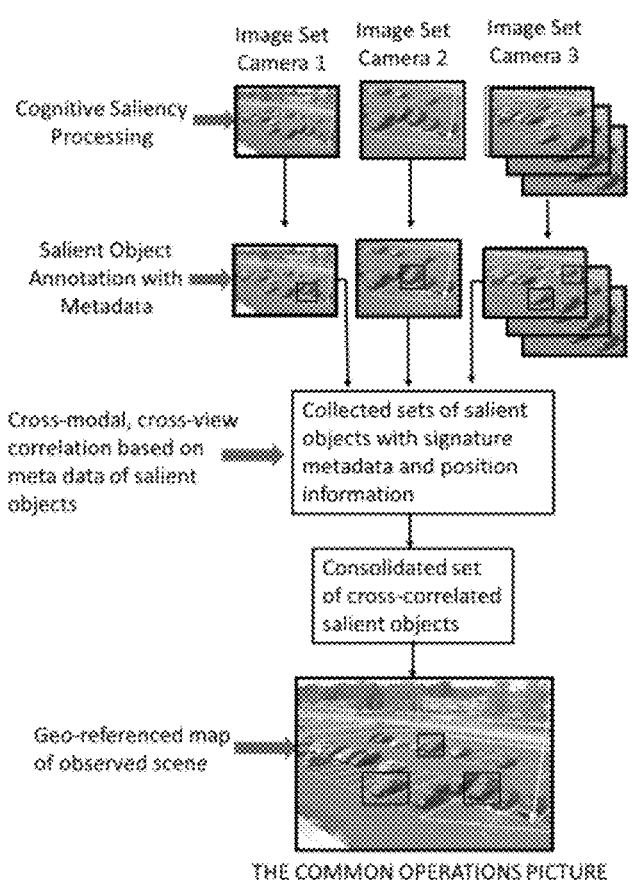
FIG. 1 illustrates the concept and objectives of the multi-sensors image content correlation and creation of the common operating picture.
Figure 2:
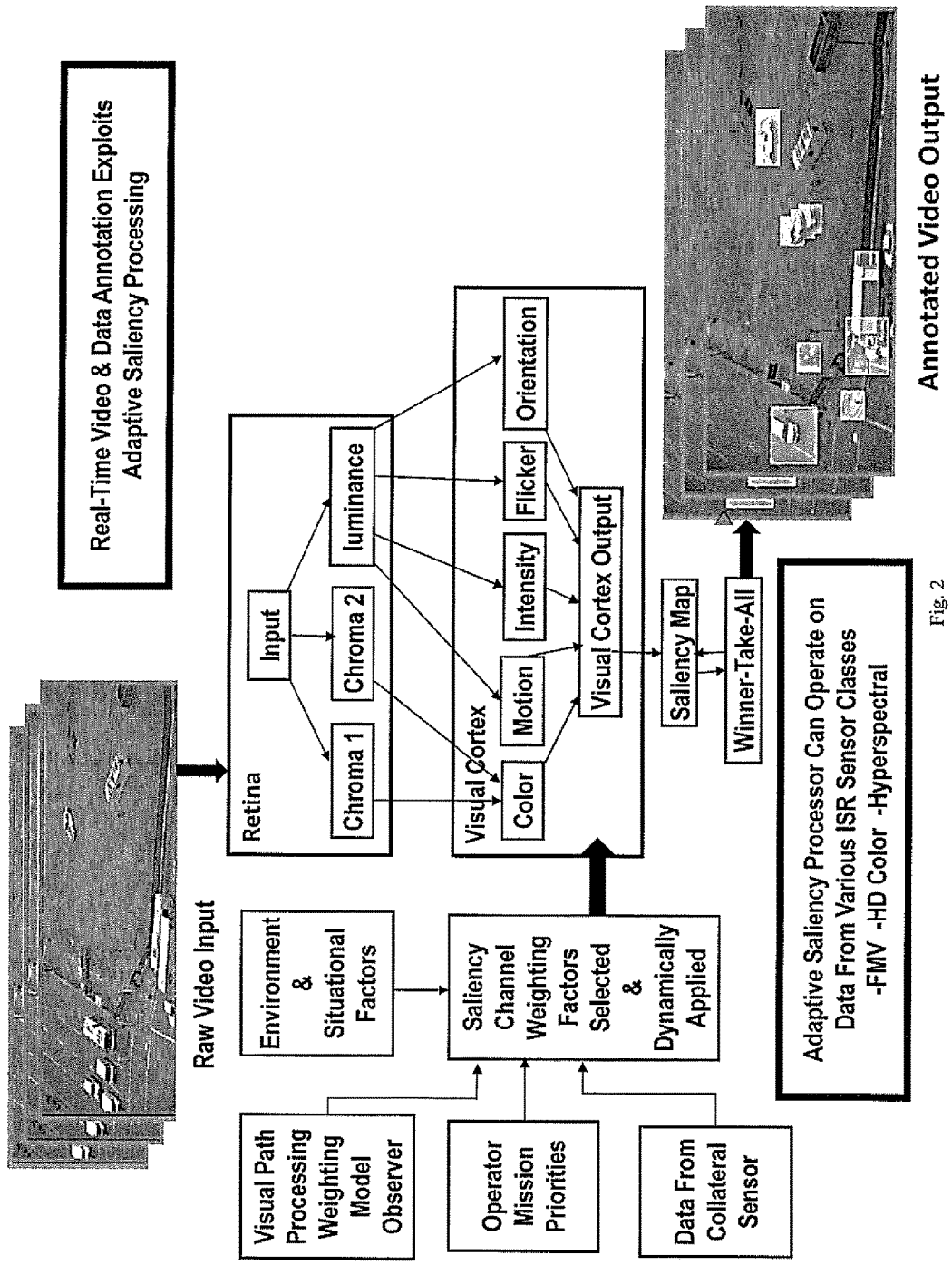
FIG. 2 shows the processing method for initially determining the salient content of each of the observed scenes from the different sensors observing the scenes.

The continuing deployment of imaging sensors presents a significant opportunity to enhance surveillance of critical areas if the data can be processed effectively from different types of imaging sensors operating under widely variable viewing conditions. Many technical challenges face the achievement of a truly effective multi-camera surveillance capability based on the many characteristics of different imaging sensors and highly variable viewing conditions, one fundamental need is the ability to rapidly determine the salient content of new imagery and compare it to the salient content of imagery from other sensors and of prior observations. FIG. 1 illustrates the overall architecture for analysis and cross-correlation of scene content across the disparate sensor types and observations based on the salient features of observed objects and activities. Irvine Sensors has developed techniques using cognitive-inspired processing illustrated in FIG. 2, for the electronic emulation of how the human visual path (eye, retina, and cortex) processes and interprets imagery. This is based on examining the spatial, temporal, and color content of imagery to determine scene object content and locate objects (people, trees, buildings, vehicles) of interest to the camera operators. Objects that are of salient interest to the system user are located, annotated, and tracked. Details of the objects spatial shape and size, types of motion observed, and color content are the basis of classification and are retained as metadata in association with the salient object. FIG. 3 further illustrates the process, for each of the disparate sensors, of detection, annotating, and classifying salient content. FIG. 4 documents the specific and unique processing architecture for extraction of salient content from image streams. If this process is performed for each of the disparate sensors types and viewing conditions produced by multi imager networks, the salient content of each is established and the quantified metadata associated with each salient object is recorded. The detected salient objects and the associated spatial, temporal, and color metadata are the inputs to a cross-modal, cross-sensor correlation process.

Associations of salient objects from sensor to sensor and from scene observations over time are used to extend the cognitive processing for detection and classification obtained from each observation of the scene by each of the involved sensors to the identification of observed objects whose salient coefficients in space, time, color exhibit a high degree of correlation at the object level. Highly cross correlated salient objects are then merged into a common operation picture by location of the highly cross-correlated objects onto a geo-registered map representation. The processing architectures illustrated in FIGS. 2, 3 and 4 require a capability for massive parallel processing to calculate the spatial, temporal, and color content and associated object degrees of correlation across filter banks of all the parts of all the images in sensor image streams and all the images in the disparate image streams. Cross-correlation analysis is then required across the spatial, temporal; color dimensions of the date sets and across all the data sets. FIG. 5 is a picture of a hardware processor that performs the required computations in real-time using a multiple GPUs with associated multicore CPUs architecture.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

I claim:

1. A signal processing appliance configured to:
   receive a plurality of image data sets observed at different times by a plurality of different sensor types each having a different viewing geometry;
   assign a time stamp and hash identifier to each of the image data sets and synchronizing a parallel image data set input into a temporal processing, motion tracking and persistence tracking processing function and synchronizing the parallel image data set input into a separate convolution and object classification processing function;
   simultaneously run at least one of a spatial, temporal, motion tracking, persistence tracking or color content convolution on the image data sets to identify one or more features of an object in the respective image data sets;
   generate a plurality of sets of image data set metadata associated with the object feature identified in the respective image data sets;
   perform a cross-modal correlation process on the respective sets of image data set metadata to correlate and identify the object feature in the image data sets; and;
   display the cross-correlated object on an electronic display.

2. The appliance of claim 1 configured to perform a correlation of a plurality of image scene objects based on an output of a plurality of Gabor filters of Higher Order Gaussian (HOG) processing.

3. The appliance of claim 1 configured to perform a process wherein a correlation of a plurality of image scene objects is performed based on an output of a plurality of Reichardt motion filters.

4. The appliance of claim 1 configured to perform a process wherein a correlation of image scene objects is performed based on an output of a multi-color filter bank.

5. The appliance of claim 1 configured to perform a Bayesian analysis to determine the object classifications.

6. The appliance of claim 1 configured to perform a plurality of simultaneous calculations of object features across disparate scenes and image data sets using multiple GPUs.

* * * * *